United States Patent
Fertig et al.

(10) Patent No.: US 11,586,094 B2
(45) Date of Patent: Feb. 21, 2023

(54) OPTICALLY RESONANT DEVICE FOR ENTANGLED PHOTON GENERATION

(71) Applicant: Honeywell International Inc., Charlotte, NC (US)

(72) Inventors: Chad Fertig, Bloomington, MN (US); Matthew Wade Puckett, Phoenix, AZ (US); Matthew Robbins, Minneapolis, MN (US); Neil A. Krueger, Saint Paul, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/374,745

(22) Filed: Jul. 13, 2021

(65) Prior Publication Data
US 2023/0012476 A1    Jan. 19, 2023

(51) Int. Cl.
*G02F 1/365* (2006.01)

(52) U.S. Cl.
CPC .......... *G02F 1/365* (2013.01); *G02F 2203/15* (2013.01)

(58) Field of Classification Search
CPC ............................. G02F 1/365; G02F 2203/15
See application file for complete search history.

(56) References Cited

U.S. PATENT DOCUMENTS

| | | |
|---|---|---|
| 7,693,369 B2 | 4/2010 | Fan et al. |
| 8,970,944 B2 | 3/2015 | Chuu et al. |
| 10,175,556 B2 | 1/2019 | Reimer et al. |
| 10,372,014 B1 * | 8/2019 | Vidrighin ............. G02F 1/3536 |
| 10,505,335 B2 | 12/2019 | Jestin et al. |
| 2011/0002573 A1 | 1/2011 | Yu et al. |
| 2014/0092467 A1 | 4/2014 | Chuu et al. |

(Continued)

FOREIGN PATENT DOCUMENTS

| | | |
|---|---|---|
| GB | 2530500 A | 3/2016 |
| WO | 2020263616 A1 | 12/2020 |

OTHER PUBLICATIONS

Lu et al., "Chip-integrated visible-telecom photon pair sources for quantum communication", Nat Phys. 2019, pp. 1 through 17, National Institute of Standards and Technology.

(Continued)

*Primary Examiner* — Daniel Petkovsek
(74) *Attorney, Agent, or Firm* — Fogg & Powers LLC (57) ABSTRACT

Improved architectures and related methods for enhancing entangled photon generation in optical systems are described. Photons from a light source are coupled from the fundamental mode into an optical resonator in a higher-order mode. The optical resonator comprises a photon generation portion configured to generate entangled photons from the coupled photons. The entangled photons are selectively extracted from the optical resonator in the fundamental mode while the remaining photons propagate through the optical resonator mode and combine with the source photons entering the optical resonator. While the source photons propagating or entering the optical resonator resonate within the optical resonator, the entangled photons are not resonant with the optical resonator, and are selectively extracted before traversing a complete cycle in the optical resonator. Extracted entangled photons can then be output for use in, for example, a communication system.

20 Claims, 7 Drawing Sheets

(56) References Cited

U.S. PATENT DOCUMENTS

| | | | |
|---|---|---|---|
| 2015/0117826 A1* | 4/2015 | Mazur | H04B 10/70 |
| | | | 385/124 |
| 2017/0212405 A1* | 7/2017 | Pant | H04B 10/70 |
| 2018/0259828 A1 | 9/2018 | Moqanaki et al. | |
| 2018/0330266 A1 | 11/2018 | Simmons et al. | |
| 2019/0149261 A1 | 5/2019 | Lipson et al. | |
| 2022/0107545 A1* | 4/2022 | Yap | G02F 1/3534 |
| 2022/0107546 A1* | 4/2022 | Yap | G02F 1/395 |

OTHER PUBLICATIONS

Ramelow et al., "Silicon-Nitride Platform for Narrowband Entangled Photon Generation", Aug. 18, 2015, pp. 1 through 10.

Lenhard et al., "Telecom-heralded single photon absorption by a single atom", Apr. 30, 2015, pp. 1 through 8.

* cited by examiner

OPTICALLY RESONANT DEVICE FOR ENTANGLED PHOTON GENERATION

BACKGROUND

In quantum communication systems, a light source transmits photons that are coupled out of an entangled photon generating element, typically composed of a second-order non-linear material, via one or more optical waveguides or free space optics. The photon generating element can generate entangled photons from a received pump light source. When interacting with the entangled photon generating element, each pump light photon has a probability of spontaneously converting into two photons of lower frequency, known individually as the signal and idler photons, or collectively as daughter photons. The quantum states of the daughter photons may be highly entangled in time, energy, momentum, polarization, or a combination thereof. The entangled photons can then be extracted from the generating element and used for various applications, for example, to facilitate the synchronization of remote satellite communications.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary, to employ concepts of the various patents, applications and publications as identified herein to provide yet further embodiments.

In one embodiment, a system is provided. The system comprises a pump light source configured to generate pump light photons. The system further comprises a first coupler coupled to the pump light source and configured to convert the pump light photons to a higher-order mode; an optical resonator coupled to the first coupler. The optical resonator comprises a photon generation portion configured to generate entangled photons from the pump light photons, in which the pump light photons resonate within the optical resonator. The system further comprises at least one second coupler coupled to the optical resonator configured to selectively extract the generated entangled photons from the photon generation portion to a first optical path distinct from the optical resonator, in which the first optical path acts as an output from the optical resonator.

BRIEF DESCRIPTION OF THE DRAWINGS

Understanding that the drawings depict only exemplary embodiments and are not, therefore, to be considered limiting in scope, the exemplary embodiments will be described with additional specificity and detail through the use of the accompanying drawings, in which.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

One focus in modern photonic circuits has been to generate pairs of entangled photons at high rates (i.e., large number of photon pairs created per second). One solution that has emerged is to couple pump photons into a waveguide in a medium having non-negligible second-order non-linear optical interaction. In such a waveguide, the pump photon has a probability to, before it exits, convert into a pair of daughter photons via the process of spontaneous parametric down conversion (SPDC). However, the probability may be very low if the waveguide is short. Making the waveguide longer introduces problems of absorption of the down converted photons. Therefore, a means of enhancing the effective interaction length for pump photons, while promptly extracting the daughter photons once generated, would greatly improve such sources.

Another focus concerns the efficiency of the entangled photon system for generating entangled photon pairs from pump photons. The rate of entangled photon pair generation is (in linearized limit and for a given pump wavelength) proportional to the intensity of the pump wave traveling through the non-linear medium, meaning that increasing the intensity of the pump wave in the non-linear medium will consequently generate more entangled photon pairs per second. In a situation where the available pump power delivered to the non-linear medium cannot be increased, a means of increasing the intensity of the wave through resonant enhancement would greatly improve the generation efficiency of such sources.

Yet another focus is implementing as many linear optical functions as feasible into integrated waveguide platforms, rather than in free space, for increased miniaturization and simplicity of batch manufacture. For example, free space optics are often used to separate the entangled photon pair mode into two modes which can be transmitted to spatially separated receivers. In a situation where free space optics would be too bulky or expensive to implement, a means of implementing photon pair separation on polarization modes while still in the waveguide would be beneficial.

The following disclosure details systems and related methodology of an improved system and method to generate entangled photon pairs. To improve the photon pair production efficiency per pump photon utilized, a waveguide optical resonator (alternatively, "resonator") is included, thereby increasing the rate of output photon pairs per second by recirculating each pump photon through multiple trips through the same non-linear waveguide, rather than the pump photon traversing only once. The optical resonator used to generate entangled photons is resonant only with respect to the input photons (e.g., the photons emitted from a pump light laser or other light source), but not with the generated entangled photons propagating in the optical resonator. For example, the down-converted photons can be extracted out of the optical resonator without risk of coupling the down-converted photons back into the optical resonator, thereby improving the extraction efficiency of the entangled photon pairs. Configuring the optical resonator this way enhances photon generation without necessitating the use of a more powerful pump laser source.

The embodiments described below improve overall efficiency through selective coupling and operation of the system components. In some embodiments, a plurality of optical couplers couple light out of the photon generation portion of the optical resonator, with each optical coupler configured to selectively extract a corresponding entangled photon having a distinct polarization state, but not the pump photons propagating within the resonator that have not yet converted to generate entangled photon pairs. In other embodiments, an optical coupler couples light from the photon generation portion of the optical resonator and extracts entangled photons from the optical resonator while simultaneously routing pump photons through an alternative pathway in a low-loss fundamental waveguide mode before coupling the input photons back into a higher-order mode of the optical resonator to enable photon pair generation via mode engineered true phase matching. Both the resonance configuration and the structure of the architecture contribute to a more efficient photonics system over existing systems.

Such embodiments may enable, for example, precise and secure synchronization of optical atomic clocks between orbiting satellites based on entangled photons transmitted from a source satellite to distance receiver satellites, or for rapid quantum key distribution (QKD), or teleportation of quantum states from one node to another distant node in a quantum network in which link losses are high and large numbers of photon pairs per second are required to maintain high quantum channel communication bandwidths.

Embodiments will be further described below with respect to the accompanying drawings.

Figure 1:
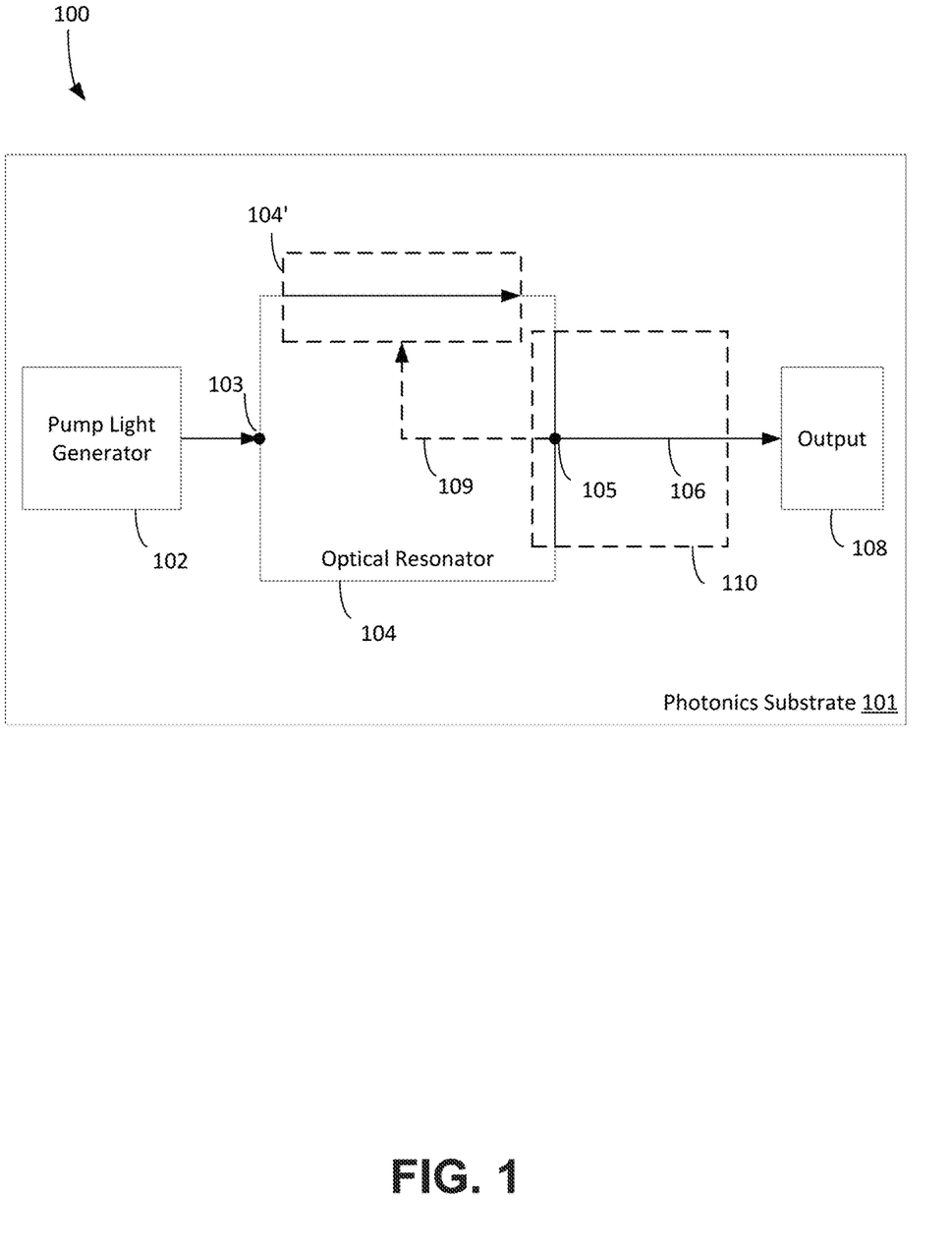
FIG. 1 is a block diagram of a system configured to generate and extract entangled photons, as described in one or more embodiments.

FIG. 1 is a block diagram of a photonics system (system) 100 configured to generate and output entangled photons. System 100 can be embodied on a photonics substrate 101, in which the components described can be partially or wholly embedded thereon or otherwise coupled to the photonics substrate 101. Photonics substrate 101 comprises a material suitable for deposition of components having second-order optical nonlinearities. In at least one embodiment, photonics substrate 101 comprises a silicon-dioxide based material. In some embodiments, photonics substrate 101 is a photonics chip on the order of 1 square millimeter. Photonics substrate 101 may further include other optical components and/or electronic and processing circuitry not shown in FIG. 1 in addition to the architecture illustrated and described below. Additionally, in some embodiments, the components shown in FIG. 1 may be disposed on more than one photonics substrate. However, in other embodiments, the optical functionality for producing and receiving entangled photons as described herein is implemented on a single, integrated platform, thereby yielding reduced optical losses, enhanced mode overlap, efficient filtering of photons, increased interferometer contrast, and improved mechanical robustness, all while reducing SWaP when compared to fiber or free space-based systems.

A pump light generator 102 is configured to generate a beam of photons having a known wavelength. Pump light generator 102 can be, for example, a continuous wave (CW) laser generating photons at a wavelength of 405 nm, but can be other photon generating sources as well. Pump light generator 102 can operate at selected power outputs but, in some embodiments, generates photons with a power of 1 mW. The photons generated by pump light generator 102 propagate in the fundamental mode (for example, through one or more optical waveguides (e.g., bus waveguides) or free space optics) towards optical coupler 103, which couples pump light generator 102 to optical resonator 104. In some embodiments, optical coupler 103 includes one or more nanowire waveguides made of a second order non-linear material, such as lithium niobate. Optical coupler 103 is configured to excite the generated photons from the fundamental mode to a higher-order mode, of which one example is the Transverse Electric mode with index 2 ("TE2"). Further details on an exemplary structure of optical coupler 103 are described with respect to FIGS. 5A-5B below; however, optical coupler 103 may be constructed in other ways as well.

Optical resonator 104 receives the higher-order-mode pump photons and is configured to generate down-converted daughter photons from the pump photons (introduced into the optical resonator 104 by coupling to a pump light source such as pump light generator 102). In some embodiments, optical resonator 104 comprises a circular or cyclical configuration of waveguides and/or optics. Optical resonator 104 includes at least a portion indicated at element 104' configured to generate entangled photons from the pump photons (referred to as an "entangled photon generation portion" or "photon generation portion"), which can include one or more second order non-linear waveguides. In some embodiments, the entangled photon generation portion can form the entirety of optical resonator 104, but in other embodiments (see FIG. 3) is only a part of the resonator structure.

When entering the optical resonator 104, pump photons propagate through the optical resonator 104 in a higher-order mode, such as the TE2 mode. A pump photon can interact with the non-linear medium portion (e.g., photon generation element 104') of the optical resonator 104 until it spontaneously down-converts into a pair (sometimes labeled "signal" and "idler" photons) of entangled daughter photons whose total energy sums to that of the pump energy. In some embodiments, the two daughter photons may have substantially half of the energy of the pump photon, and therefore substantially twice the wavelength of the pump photon. In other embodiments, the two daughter photons have substantially different wavelengths from one another, though still satisfying the rule that their energies sum to that of the pump photon. The process of spontaneous down conversion imbues the signal and idler photons with substantial quantum correlations in the spin, momentum-position, and energy-time. In some embodiments, the entangled daughter photons occupy orthogonally polarized waveguide modes, such as a transverse-magnetic mode index zero (TM0) and transverse-electric mode index zero (TE0) waveguide modes. In embodiments similar to those described in FIG. 2 below, the structure of the waveguides in resonator 104 enables phase-matching of the pump wave with the signal and idlers waves by the selective coupling of pump photons into a non-fundamental (for example, the TE2) mode, whereas the daughter photons are generated in and propagate a fundamental (for example TE0 or TM0) mode of the non-linear. In other embodiments, phase-matching may occur through the well-known process of periodic poling of the non-linear medium in the region of the resonator in which down-conversion is to occur.

As the power of the pump light resonating in optical resonator 104 increases, the probability of generating entangled photons per input pump photon in the optical resonator likewise increases. Therefore, optical resonator 104 is configured to be in resonance with the pump light generated by pump light generator 102 so that the photons propagating through optical resonator 104 constructively interfere with other pump photons entering optical resonator 104 via optical coupler 103. This increases the power of the light used to generate entangled photons within system 100 without having to increase the power of pump light generator 102. For example, if pump light generator 102 generates photons at a power level of 1 mW, then optical resonator 104 can be configured to maintain a circulating power in the resonator one hundred times greater, such as 100 mW.

Down-converted photons generated by the photon-generation portion of optical resonator 104 propagate at the fundamental mode rather than the higher-order mode of the pump photons. These down-converted entangled photons can then be extracted at an extraction region 110 coupled to optical resonator 104. Extraction region 110 includes one or more optical couplers 105 coupled to optical resonator 104 at selected points, which enable optical coupler(s) 105 to extract the generated entangled photons from optical resonator 104. One or more waveguides 106 receive the extracted entangled photons and provide the photons to an output 108. In some embodiments, optical coupler(s) 105 extract the generated entangled photons and further configured to route the pump photons back into the photon generation portion 104' of optical resonator 104, which is illustrated in FIG. 1 as optical pathway 109 and in which is further described in FIG. 3. It should be noted that, in some embodiments (see FIG. 2), photon generation portion 104' comprises all of the optical path of optical resonator 104, or to put another way, all sub-portions of the optical path in optical resonator 104 are configured to generate entangled photons. Detailed embodiments, as illustrated in FIGS. 2-3, illustrate various additional examples of architectures in which extraction region 110 can be implemented.

However, optical resonator 104 is not configured to act as a resonator for the entangled photons generated within the optical resonator. Instead, optical resonator 104 is only configured to be resonant with the pump photons. Entangled photons extracted through extraction region 110, therefore, do not couple back into optical resonator 104 once they are extracted. As a result, one or more couplers 105 in extraction region 110 can selectively extract entangled photons from optical resonator 104 without perturbing the resonance of the pump photons within optical resonator 104. Furthermore, the one or more optical couplers 105 can be positioned such that generated entangled photons from optical resonator 104 can be extracted without propagating more than one round trip of the optical resonator. This configuration creates entangled photons with energy-time quantum correlations substantially similar to entangled photon pairs produce in single pass non-linear photon sources. By configuring the optical resonator 104 to be resonant for the pump photons and not the down-converted entangled photons, system 100 can improve the efficiency of entangled photon generation over existing photonics systems both by increasing the probability of entangled photon generation per pump photon while selectively extracting the entangled photons.

Entangled photons extracted from extraction region 110 are then provided through an output 108. Modern quantum communications systems utilize entangled photons generated by system 100 for a variety of applications, including synchronization of satellites within satellite communication networks, quantum communications systems (e.g., satellite communications), and other applications, largely because of the informational properties entangled photon pairs can possess as a result of their quantum entanglement state. Thus, output 108 can be coupled (e.g., optically, electrically, and/or communicatively) to additional optical devices and/or systems that use the entangled photons for a particular purpose. For example, in some embodiments, the entangled photons can be provided through output 108 to additional optical components that prepare and transmit the entangled photons to an optical receiver of a satellite positioned remotely from system 100. Additionally, system 100 can include additional optical components in between extraction region 110 and output 108 to filter and/or process the extracted entangled photons.

Figure 2:
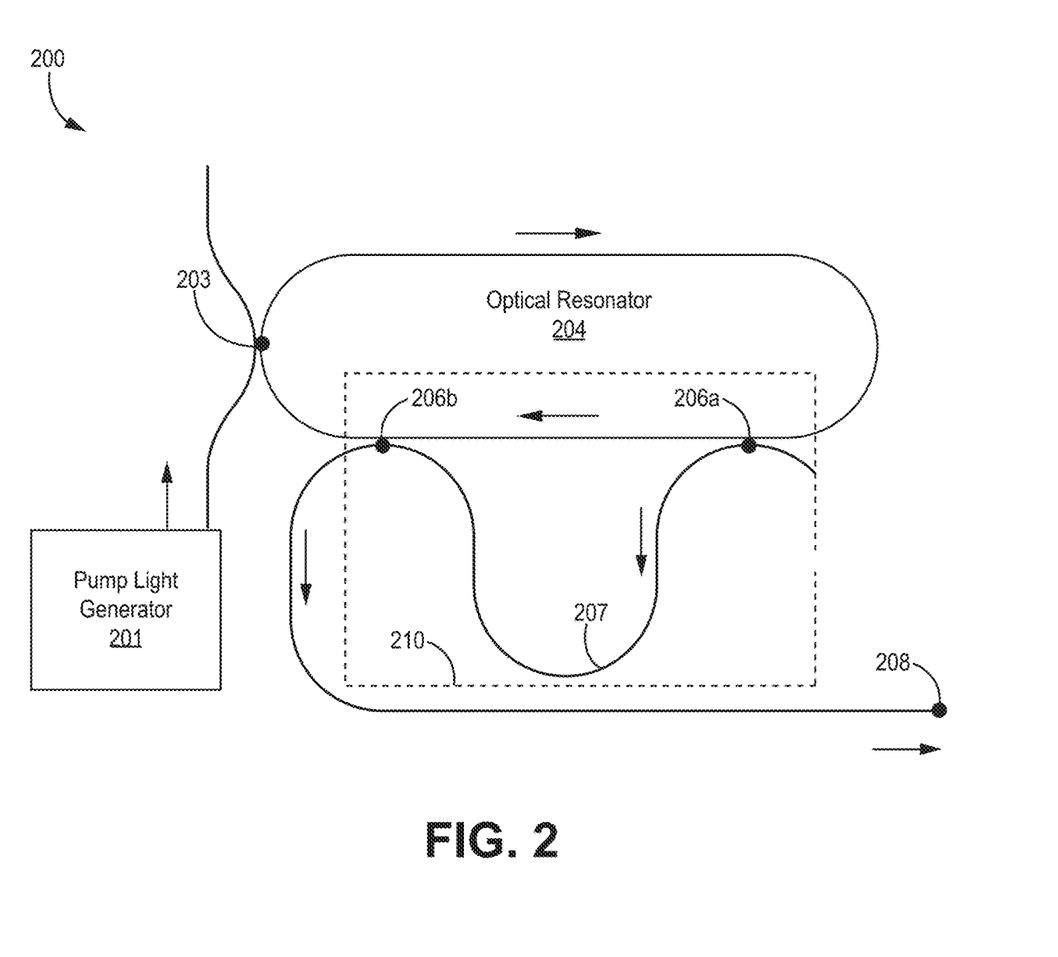
FIG. 2 is a schematic diagram of a system configured to generate and extract entangled photons.
Figure 3:
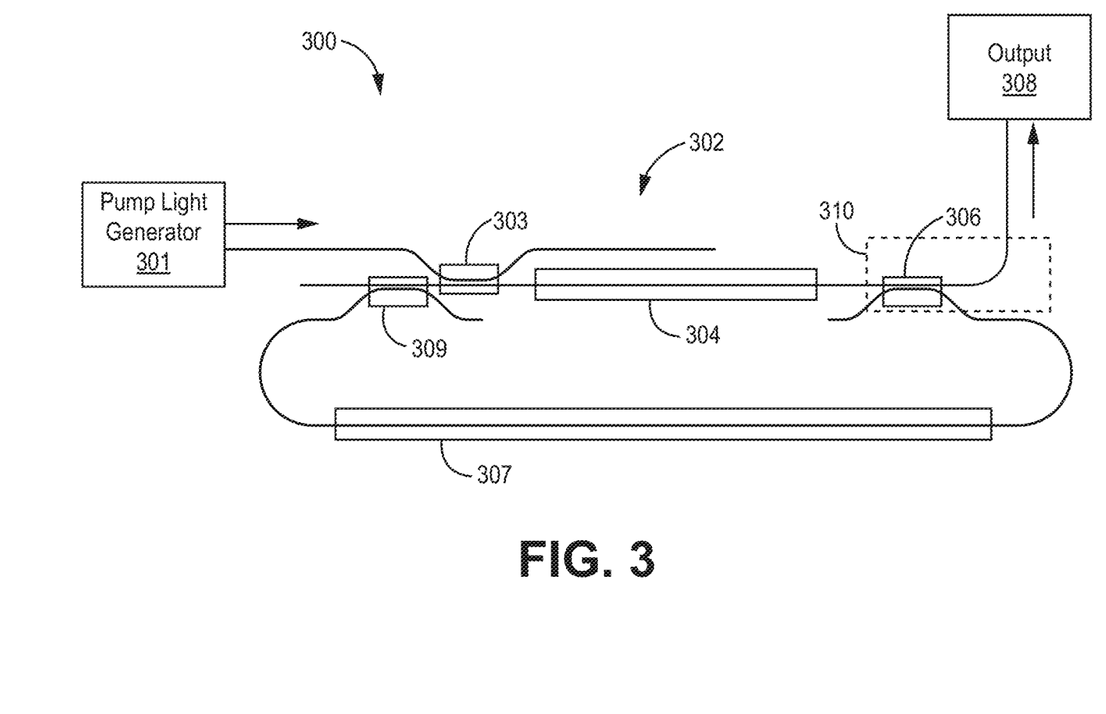
FIG. 3 is a schematic diagram of a system configured to generate and extract entangled photons, as described in one or more embodiments.

FIG. 2 illustrates one embodiment of a system 200 configured to generate and extract entangled photons. System 200 represents one example embodiment of system 100 described above with respect to FIG. 1. In particular, system 200 is, in one example, a singly-resonant system in which optical resonator 204 is in resonance with pump photons from a pump light generator 201 but not with down-converted photons generated within the optical resonator.

Similar to FIG. 1, pump light generator 201 is configured to generate and transmit pump photons in the fundamental mode at a first frequency into optical coupler 203. Optical coupler 203 couples the pump photons from the fundamental mode to a higher mode into optical resonator 204. In one embodiment, optical coupler 203 receives the pump photons in the fundamental mode at a receiving port, converts the pump photons to a higher order mode (for example, a second order mode), and couples the higher order pump photons into optical resonator 204 through an output port. As the pump photons traverse about optical resonator 204, the pump photons may convert into two entangled photons, each having substantially half the optical frequency of the input photon. In some embodiments, one of the entangled photons is polarized in the TM state, and the other is polarized in the TE state. In other embodiments, the two photons have substantially different frequencies. Once the entangled photons are generated, they are extracted out from optical resonator 204 via extraction region 210 instead of propagating through the optical resonator 204.

In the example shown in FIG. 2, extraction region 210 includes optical couplers 206a and 206b coupled at distinct points to optical resonator 204. In some embodiments, optical couplers 206a-b are slot waveguides configured to extract photons at defined frequencies, wavelengths, or modes. Specifically, optical couplers 206a-b are configured to only extract entangled photons generated in optical resonator 204, and not the pump photons still propagating through the optical resonator. Optical couplers 206a-b are further configured to selectively couple one respective type of entangled photon (for example, either the signal or the idler) from the two entangled photons generated by one down-converting pump photon. For example, optical coupler 206a can be configured to extract only entangled photons in the TM polarization state, while optical coupler 206b is configured to extract only entangled photons in the TE polarization state. Optical couplers 206a-b extract the entangled photons in the fundamental mode from the optical resonator 204.

Extraction region 210 also includes waveguide 207 coupled to both optical couplers 206a-b. Since each of the two entangled photons is selectively extracted from optical resonator 204 at a different point in the optical resonator, the two entangled photons may have a relative delay in their time of emission at output coupler 208. Accordingly, waveguide 207 is configured to couple the one of the pair of entangled photons extracted from optical coupler 206a (e.g., the TM photons) to optical coupler 206b, where the other of the pair of entangled photons (e.g., the TE photons) is extracted. To re-synchronize the emission of the two entangled photons at output coupler 208, waveguide 207 is designed to be a suitable length so that when the TM photons reach optical coupler 206b, they will be in phase with the TE photons extracted from optical resonator 204 at optical coupler 206b. For example, waveguide 207 can have a length that corresponds to the change or displacement in optical path length between the extraction path of the TM and TE photons. Thus, optical couplers 206a-b can be placed anywhere along optical resonator 204 provided that waveguide 207 is configured to re-synchronize the first entangled photon to the second entangled photon of a pair when both entangled photons are extracted from optical resonator 204.

Once the entangled photons are extracted from optical resonator 204 via extraction region 210, they can be provided as an output 208 of system 200.

FIG. 3 illustrates another embodiment of a system 300 configured to generate and extract entangled photons. System 300 represents another example embodiment of system 100 described above with respect to FIG. 1, in which the optical resonator used to generate entangled photons is resonant with the pump light generator but not the down-converted entangled photons generated in the optical resonator.

Similar to systems 100 and 200, pump light generator 301 generates and transmits pump photons at a frequency in the fundamental mode to optical coupler 303. Optical coupler 303 is configured to convert the pump photons at the fundamental mode to a higher-order mode to photon generation portion 304 of optical resonator 302. In some embodiments, photon generation portion 304 is configured to generate down-converted entangled photons each having frequencies that are substantially half the frequency of the corresponding pump photons from pump light generator 301. In some embodiments, photon generation portion 304 is configured to generate entangled photons having substantially different frequencies, but whose frequencies sum to the that of the frequency of the pump photons. In some embodiments, optical coupler 303 is an asymmetric waveguide.

FIG. 3 illustrates an example of a system in which only a portion of the optical resonator is configured to generate entangled photons. As shown in FIG. 3, the components of optical coupler 306, return waveguide 307, optical coupler 309, and entangled photon generation portion 304 form the optical resonator 302, but as described below, only entangled photon generation portion 304 converts pump photons into entangled photon pairs, for example, by down-conversion.

System 300 also includes extraction region 310 configured to extract the generated entangled photons from the optical resonator and not the pump photons from pump light generator 301. In the embodiment shown in FIG. 3, extraction region 310 includes an optical coupler 306 downstream of entangled photon generation portion 304. Optical coupler 306 is configured to receive both pump photons and down-converted photon pairs and routes each type of photon to different parts of system 300 depending on the wavelength of a photon that is received.

For the pump photons, optical coupler 306 is configured to couple at least a portion of the down-converted photons from photon generation portion 304 to return waveguide 307. Optical coupler 306 is also configured to couple the pump photons from a higher-order mode to a fundamental mode. In some embodiments, optical coupler 306 is configured to couple 100% or approximately 100% of the higher-order-mode pump photons into fundamental mode pump photons. Optical coupler 306 is coupled to return waveguide 307 directly or by one or more intervening couplers. The pump photons coupled into return waveguide 307 by optical coupler 306 propagate in the fundamental mode of return waveguide 307.

The pump photons in return waveguide 307 are transmitted to optical coupler 309 (e.g., directly or by one or more intervening couplers). Optical coupler 309 is configured to direct pump photons into the photon generation portion 304 from the fundamental mode to the higher-order mode. This architecture enhances the probability of a pump photon injected from pump light generator 301 to down-convert before it is lost by re-directing any pump photons that have not undergone down-conversion back into photon generation portion 304, where they may again have a chance to undergo down-conversion into an entangled photon pair. So long as pump photons pass through photon generation portion 304 without undergoing down-conversion, they can be continually routed through optical coupler 306, return waveguide 307, and optical coupler 309. Furthermore, this architecture reduces power loss of pump light recycled through the photonics system since recycled pump photons propagate in the fundamental order (and not a higher order) mode of return waveguide 307. In particular, the path between optical couplers 306, return waveguide 307, and optical coupler 309 facilitates reduced propagation loss because the propagation loss coefficient for the fundamental mode is inherently lower than the propagation loss coefficient of higher-order modes. Pump photons do not undergo down-conversion while traversing through the path between optical coupler 306 through return waveguide 307 to optical coupler 309; only photon generation portion 304 is configured to generate down-converted entangled photons from pump photons.

Down-converted entangled photons that are generated in photon generation portion 304 do not undergo extraction via the optical path of optical coupler 306, return waveguide 307, and optical coupler 309 as described above for pump photons. Instead, entangled photons are extracted through extraction region 310 through the upper right pathway illustrated in system 300. In this example embodiment, optical coupler 306 is configured to extract the entangled photons through a port that is distinct from a port used to re-cycle pump photons as described above. In contrast to FIG. 2, all entangled photons are extracted by optical coupler 306 instead of multiple selective couplers coupled to the optical resonator. Utilizing only a single optical coupler to extract entangled photons from the resonator simplifies the architecture and enables improved power output with reduced optical components directly coupled to the higher-order resonator. In some embodiments, one or more selective couplers can be coupled downstream of optical coupler 306 between output 308 to extract the TM and TE photons separately, for example, using the optical couplers 206a-b described in FIG. 2 (but coupled to the output of optical coupler 306 instead of the optical resonator). The downconverted entangled photons are provided through output 308.

Figure 4A:
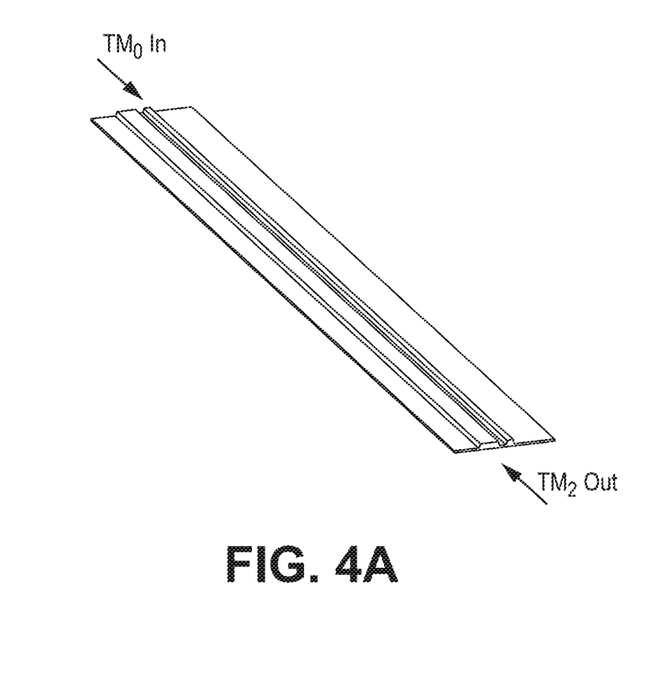
FIG. 4A is a waveguide configured to transmit photons from the fundamental mode to a higher-order mode, as described in one or more embodiments.
Figure 4B:
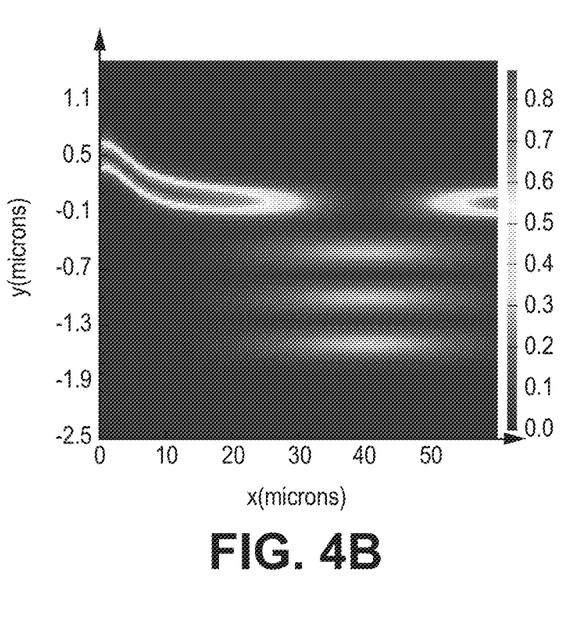
FIG. 4B is a graphical representation of the photon intensity between the fundamental mode and higher-order mode for the waveguide shown in FIG. 4A.

FIGS. 4A and 4B illustrate the structure and function of an example optical coupler configured to couple fundamental mode photons into a higher-order mode, for example, optical couplers 103, 203, 303, and 309. FIG. 4A illustrates the structure of one such example of an optical coupler. FIG. 4B depicts the photon intensity between the fundamental mode and higher-order mode for the waveguide shown in FIG. 4A.

Referring to FIG. 4A, light from the fundamental mode can enter through an input port of the optical coupler. Interaction with the optical coupler causes the input light to excite to a higher-order mode that is transmitted out of an output port of the optical coupler. As shown in FIG. 4B, the high-intensity fundamental mode light entering from the input port converts at least a portion of the light into a less intense higher-order mode, as indicated by the three horizontal parallel lines. This higher-order light is transmitted through one output port of the optical waveguide, which can be coupled to, for example, any of the optical resonators described herein. Residual light that is not excited to the higher-order mode can be reflected out of the optical waveguide by a second output port. In some embodiments, such as optical couplers 306 and 309 of FIG. 3, the optical couplers are configured to convert approximately 100% of the pump light from a higher-order mode to the fundamental mode, or 100% of the pump light from a lower order mode to a higher order mode. In other embodiments, such as optical coupler 303 of FIG. 3, the optical couplers are configured to substantially match the round trip loss for pump photons circulating within the resonator, resulting in substantial destructive interference of the pump wave at the reflection port of the optical coupler 303 such that approximately 100% of the pump photons injected from the pump light generator 301 can enter the resonator through optical coupler 303.

Figure 5A:
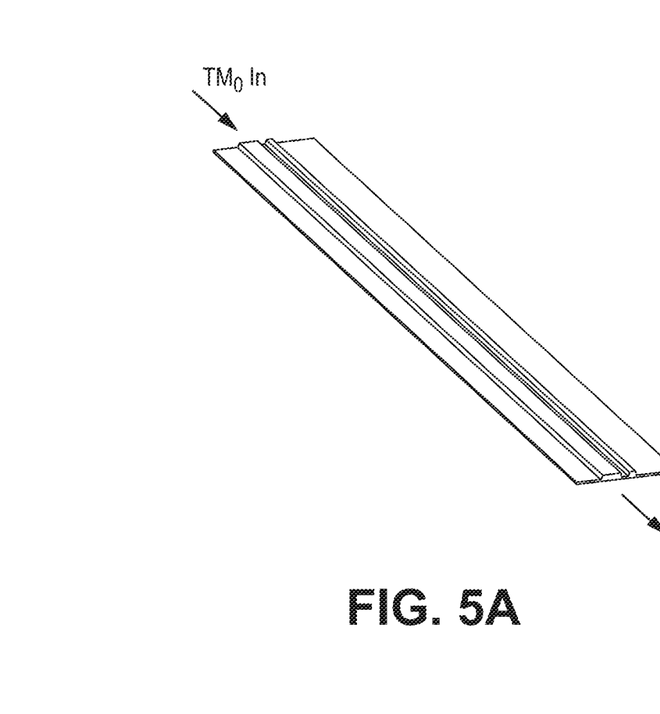
FIG. 5A is a waveguide configured to transmit photons from the fundamental mode, as described in one or more embodiments.
Figure 5B:
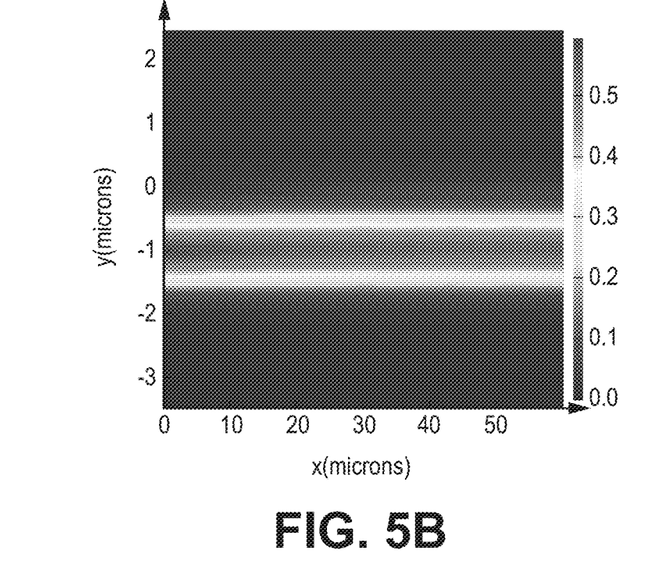
FIG. 5B is a graphical representation of the photon intensity for the waveguide shown in FIG. 5A.

FIGS. 5A and 5B illustrate the structure and function of an example optical coupler configured to couple photons in the fundamental mode of its input port to the fundamental mode of its output port. Such optical couplers can include, for example, optical couplers 105 and 306. Similar to FIG. 4A, light in the fundamental mode enters the optical coupler through an input port and is output through the optical coupler via an output port. As shown in FIG. 5B, the power of light entering and transmitting out of the optical coupler remains approximately constant with minimal loss in power.

Figure 6A:
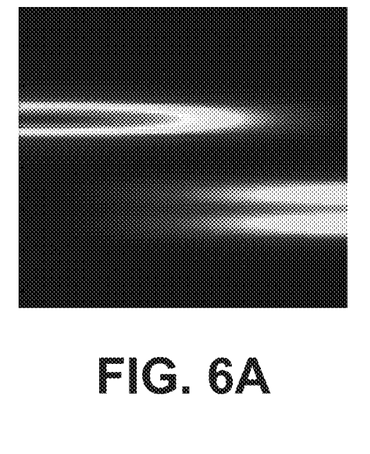
FIGS. 6A and 6B are graphical representations of TM and TE photons, respectively, as they are extracted from a higher-order mode to the fundamental mode in a waveguide, as described in one or more embodiments.
Figure 6B:
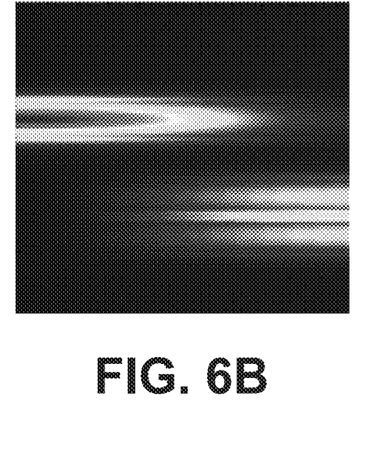

FIGS. 6A and 6B illustrate the selective coupling of entangled photons from a selective optical coupler, such as optical couplers 105 and 206a-b. Referring to FIG. 6A, a portion of the high-intensity light from the optical resonator shown in the upper left part of FIG. 6A is provided at an input of the optical coupler (indicated by the two horizontally parallel lines in the bottom right part of FIG. 6A). The low-intensity light in the bottom right part of FIG. 6A corresponds to the downconverted entangled photons that are extracted from the optical resonator. In the example shown in FIG. 6A, only TM light is coupled out of the optical resonator to the fundamental mode.

Likewise, in FIG. 6B, a portion of the high-intensity light from the optical resonator propagating in the higher-order mode shown in the top left part of FIG. 6B is converted to lower intensity light propagating in the fundamental mode (indicated by the three horizontally parallel lines near the bottom right corner). The low-intensity light in the bottom right part of FIG. 6B corresponds to the downconverted entangled photons that are extracted from the optical resonator. In the example shown in FIG. 6B, only TE light is coupled out of the resonator to the fundamental mode.

Figure 7:
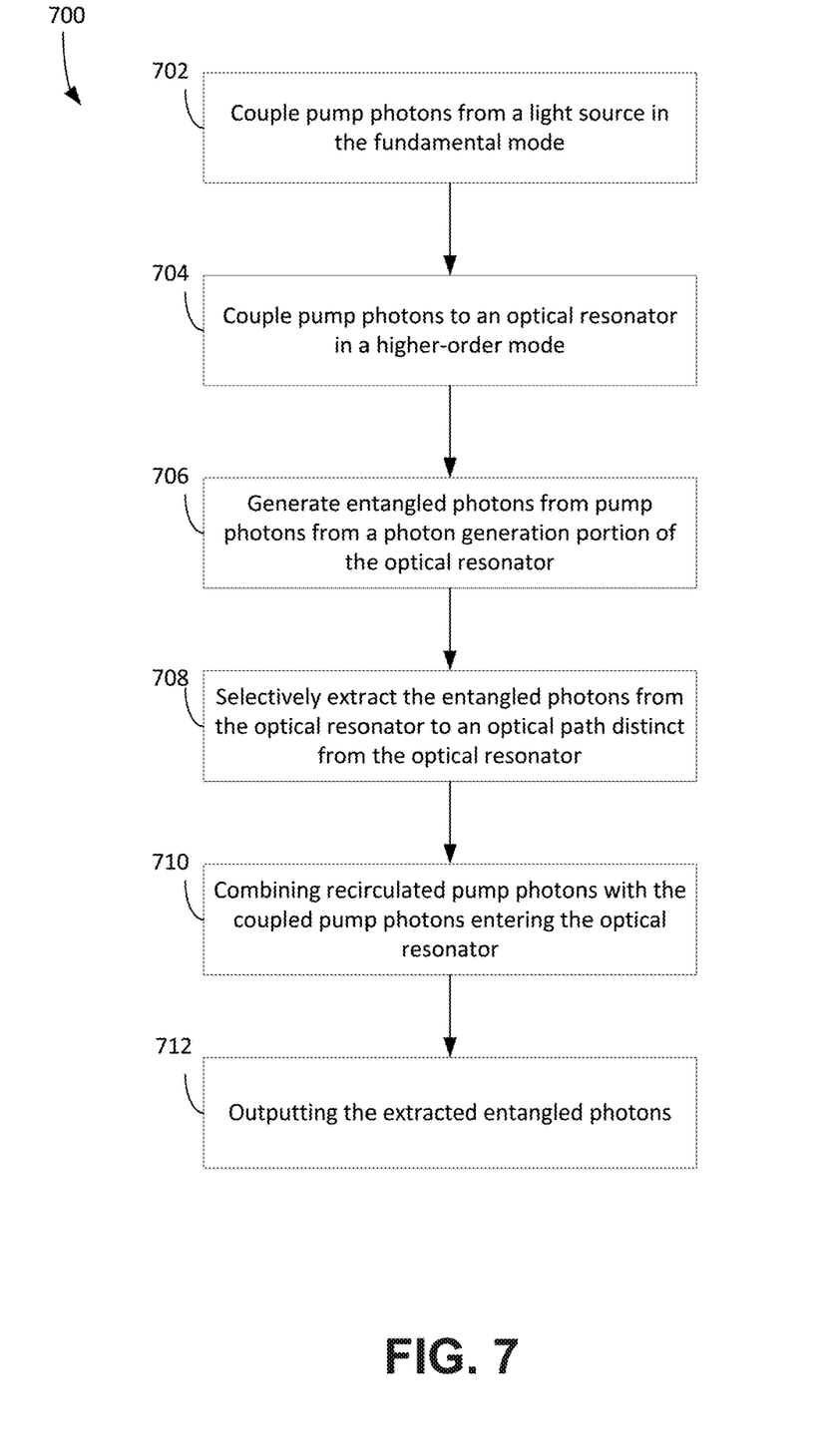
FIG. 7 is a flow diagram of a method for generating and extracting entangled photons, as described in one or more embodiments.

FIG. 7 is a flow diagram of a method for generating and extracting entangled photons. Method 700 may be implemented using any of the systems and embodiments thereof described above with respect to FIGS. 1-6, but may be implemented through other means as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 700 begins at block 702 by coupling pump photons received from a light source into an optical waveguide (a bus waveguide, for example). The light source can be a pump light generator (such as a pump light laser) or other type of source. The method proceeds to block 704 by coupling the pump photons from the optical waveguide into an optical resonator. In doing so, the pump photons excite from the fundamental mode into a higher-order mode.

At block 706, method 700 generates entangled photons from the pump photons from a photon generation portion of the optical resonator. In some embodiments, the pump photons undergo spontaneous down-conversion to generate phase-matched entangled photons. In some embodiments, the entangled photons have distinct polarization states, such as a TM or TE-polarization state.

Method 700 then proceeds to block 708 by selectively extracting the entangled photons from the optical resonator. In some embodiments, the entangled photons are extracted while selectively coupling the pump photons into the fundamental mode of a recirculating waveguide that couples the pump photons back into the photon generation portion of the optical resonator. In some embodiments, the entangled photons are extracted while the pump photons continue to propagate through the photon generation portion of the optical resonator (in some embodiments, the optical resonator as a whole is configured to generate entangled photons).

Method 700 proceeds to block 710 by combining the recirculated pump photons with pump photons from the optical (bus) waveguide into the entangled photon generation portion of the optical resonator. In some embodiments, the recirculated pump photons are combined through a recirculation waveguide of the optical resonator in the fundamental mode, while in other embodiments, the recirculated pump photons combined directly with the pump photons in the higher-order mode. Both the combined pump photons from the bus waveguide and the recirculated pump photons propagate in a higher-order mode while in the photon generation portion of the optical resonator.

At block 712, method 700 proceeds by outputting the extracted entangled photons.

The terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

EXAMPLE EMBODIMENTS

Example 1 includes a system, comprising: a pump light source configured to generate pump light photons; a first coupler coupled to the pump light source and configured to convert the pump light photons to a higher-order mode; an optical resonator coupled to the first coupler, wherein the optical resonator comprises a photon generation portion configured to generate entangled photons from the pump light photons, wherein the pump light photons resonate within the optical resonator; and at least one second coupler coupled to the optical resonator configured to selectively extract the generated entangled photons from the photon generation portion to a first optical path distinct from the optical resonator, wherein the first optical path acts as an output from the optical resonator.

Example 2 includes the system of Example 1, wherein the at least one second coupler is configured to provide the pump photons to a second optical path distinct from the first optical path.

Example 3 includes the system of any of Examples 1-2, wherein the at least one second coupler is configured to selectively extract the generated entangled photons through a first output port of the at least one second coupler, and wherein the at least one second coupler is configured to extract the pump light photons out of the photon generation portion through a second output port of the at least one second coupler.

Example 4 includes the system of any of Examples 1-3, wherein the photon generation portion is configured to generate entangled photons that propagate in a fundamental mode, and wherein the pump light photons propagate through the photon generation portion in the higher-order mode.

Example 5 includes the system of any of Examples 3-4, wherein the optical resonator further comprises at least one waveguide coupled to the at least one second coupler, wherein the extracted pump light photons propagate through the at least one waveguide in a fundamental mode, wherein the at least one waveguide is configured to route the extracted pump light photons back to the photon generation portion of the optical resonator.

Example 6 includes the system of any of Examples 1-5, wherein the optical resonator comprises one or more non-linear waveguides arranged in a cyclical configuration.

Example 7 includes the system of any of Examples 1-6, wherein the generated entangled photons have one of a transverse magnetic (TM) and transverse electric (TE) polarization state.

Example 8 includes the system of any of Examples 1-7, wherein the pump light source comprises a continuous wave (CW) laser.

Example 9 includes the system of any of Examples 1-8, wherein the system is disposed on or at least partially embedded in a single photonics substrate.

Example 10 includes a photonics circuit, comprising: a first coupler, the first coupler configured to receive photons from a light source at a fundamental mode and convert the received photons to a higher-order mode; an optical resonator coupled to the first coupler, wherein the optical resonator comprises a photon generation portion configured to generate entangled photons from the received photons, wherein the received photons resonate within the optical resonator; at least one second coupler coupled to the optical resonator configured to selectively extract the generated entangled photons from the photon generation portion to a first optical path distinct from the optical resonator, wherein the first optical path acts as an output from the optical resonator.

Example 11 includes the photonics circuit of Example 10, wherein the at least one second coupler comprises a plurality of second couplers, wherein one second coupler of the plurality of second couplers is configured to selectively extract a first portion of the generated entangled photons having a first polarization state; and wherein another second coupler of the plurality of second couplers is configured to selectively extract a second portion of the generated entangled photons having a second polarization state.

Example 12 includes the photonics circuit of Example 11, further comprising a waveguide coupled between the plurality of second couplers, wherein the waveguide is configured to route the first portion of generated entangled photons having the first polarization state to the second portion of generated entangled photons having the second polarization state.

Example 13 includes the photonics circuit of Example 12, wherein the waveguide has a length corresponding to an optical path length difference between the plurality of second couplers.

Example 14 includes the photonics circuit of any of Examples 10-13, wherein the at least one second coupler is configured to selectively extract the generated entangled photons through a first output port of the at least one second coupler, and wherein the at least one second coupler is configured to extract the received photons out of the photon generation portion through a second output port of the at least one second coupler.

Example 15 includes the photonics circuit of Example 14, wherein the optical resonator further comprises at least one waveguide coupled to the at least one second coupler, wherein the extracted received photons propagate through the at least one waveguide in the fundamental mode, wherein the at least one waveguide is configured to route the extracted received photons back to the photon generation portion of the optical resonator.

Example 16 includes the photonics circuit of Example 15, wherein the optical resonator further comprises a third coupler coupled to the photon generation portion and the at least one waveguide, wherein the third coupler is configured to convert the received photons to the higher-order mode and couple the received photons into the photon generation portion.

Example 17 includes the photonics circuit of any of Examples 10-16, wherein the photon generation portion is not resonant with the generated entangled photons.

Example 18 includes the photonics circuit of any of Examples 10-17, wherein the at least one second coupler is configured to provide the received photons to a second optical path distinct from the first optical path.

Example 19 includes a method, comprising: coupling pump photons from a light source to an optical resonator from a fundamental mode to a higher-order mode; generating entangled photons from pump photons propagating through the optical resonator, wherein the pump photons resonate within the optical resonator; selectively extracting the entangled photons from the optical resonator via at least one coupler coupled to the optical resonator to a first optical path distinct from the optical resonator; combining the pump photons propagating through the optical resonator with the coupled pump photons via a second optical path distinct from the first optical path; and outputting the entangled photons to a communication system.

Example 20 includes the method of Example 19, wherein the second optical path is a portion of the optical resonator, wherein the pump photons propagate through the second optical path in the fundamental mode, and wherein combining the pump photons propagating through the optical resonator with the coupled pump photons comprises converting the pump photons from the fundamental mode to the higher-order mode at a photon generation portion of the optical resonator, wherein the photon generation portion is distinct from the second optical path.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   a pump light source configured to generate pump light photons;
   a first coupler coupled to the pump light source and configured to convert the pump light photons to a higher-order mode;
   an optical resonator coupled to the first coupler, wherein the optical resonator comprises a photon generation portion configured to generate entangled photons from the pump light photons, wherein the pump light photons resonate within the optical resonator; and
   at least one second coupler coupled to the optical resonator and configured to selectively extract the generated entangled photons from the photon generation portion to a first optical path distinct from the optical resonator, wherein the first optical path acts as a common output for the generated entangled photons from the optical resonator.

2. The system of claim 1, wherein the at least one second coupler is configured to provide the pump light photons to a second optical path distinct from the first optical path.

3. The system of claim 1, wherein the at least one second coupler is configured to selectively extract the generated entangled photons through a first output port of the at least one second coupler, and wherein the at least one second coupler is configured to extract the pump light photons out of the photon generation portion through a second output port of the at least one second coupler.

4. The system of claim 3, wherein the optical resonator further comprises at least one waveguide coupled to the at least one second coupler, wherein the extracted pump light photons propagate through the at least one waveguide in a fundamental mode, wherein the at least one waveguide is configured to route the extracted pump light photons back to the photon generation portion of the optical resonator.

5. The system of claim 1, wherein the photon generation portion is configured to generate entangled photons that propagate in a fundamental mode, and wherein the pump light photons propagate through the photon generation portion in the higher-order mode.

6. The system of claim 1, wherein the optical resonator comprises one or more non-linear waveguides arranged in a cyclical configuration.

7. The system of claim 1, wherein the generated entangled photons have one of a transverse magnetic (TM) and transverse electric (TE) polarization state.

8. The system of claim 1, wherein the pump light source comprises a continuous wave (CW) laser.

9. The system of claim 1, wherein the system is disposed on or at least partially embedded in a single photonics substrate.

10. A photonics circuit, comprising:
    a first coupler, the first coupler configured to receive photons from a light source at a fundamental mode and convert the received photons to a higher-order mode;
    an optical resonator coupled to the first coupler, wherein the optical resonator comprises a photon generation portion configured to generate entangled photons from the received photons, wherein the received photons resonate within the optical resonator;
    at least one second coupler coupled to the optical resonator configured to selectively extract the generated entangled photons from the photon generation portion to a first optical path distinct from the optical resonator, wherein the first optical path acts as a common output for the generated entangled photons from the optical resonator.

11. The photonics circuit of claim 10, wherein the at least one second coupler comprises a plurality of second couplers, wherein one second coupler of the plurality of second couplers is configured to selectively extract a first portion of the generated entangled photons having a first polarization state; and wherein another second coupler of the plurality of second couplers is configured to selectively extract a second portion of the generated entangled photons having a second polarization state.

12. The photonics circuit of claim 11, further comprising a waveguide coupled between the plurality of second couplers, wherein the waveguide is configured to route the first portion of generated entangled photons having the first polarization state to the second portion of generated entangled photons having the second polarization state.

13. The photonics circuit of claim 12, wherein the waveguide has a length corresponding to an optical path length difference between the plurality of second couplers.

14. The photonics circuit of claim 10, wherein the at least one second coupler is configured to selectively extract the generated entangled photons through a first output port of the at least one second coupler, and wherein the at least one second coupler is configured to extract the received photons out of the photon generation portion through a second output port of the at least one second coupler.

15. The photonics circuit of claim 14, wherein the optical resonator further comprises at least one waveguide coupled to the at least one second coupler, wherein the extracted received photons propagate through the at least one waveguide in the fundamental mode, wherein the at least one waveguide is configured to route the extracted received photons back to the photon generation portion of the optical resonator.

16. The photonics circuit of claim 15, wherein the optical resonator further comprises a third coupler coupled to the photon generation portion and the at least one waveguide, wherein the third coupler is configured to convert the received photons to the higher-order mode and couple the received photons into the photon generation portion.

17. The photonics circuit of claim 10, wherein the photon generation portion is not resonant with the generated entangled photons.

18. The photonics circuit of claim 10, wherein the at least one second coupler is configured to provide the received photons to a second optical path distinct from the first optical path.

19. A method, comprising:
- coupling pump photons from a light source to an optical resonator from a fundamental mode to a higher-order mode;
- generating entangled photons from the pump photons propagating through the optical resonator, wherein the pump photons resonate within the optical resonator;
- selectively extracting the entangled photons from the optical resonator via at least one coupler coupled to the optical resonator to a first optical path distinct from the optical resonator, wherein the first optical path acts as a common output for the generated entangled photons from the optical resonator;
- combining the pump photons propagating through the optical resonator with the coupled pump photons via a second optical path distinct from the first optical path; and
- outputting the entangled photons to a communication system.

20. The method of claim 19, wherein the second optical path is a portion of the optical resonator, wherein the pump photons propagate through the second optical path in the fundamental mode, and wherein combining the pump photons propagating through the optical resonator with the coupled pump photons comprises converting the pump photons from the fundamental mode to the higher-order mode at a photon generation portion of the optical resonator, wherein the photon generation portion is distinct from the second optical path.

* * * * *